United States Patent [19]
Griffin

[11] Patent Number: 5,619,953
[45] Date of Patent: Apr. 15, 1997

[54] CAT SCRATCHING POST FOR USE WITH FURNITURE

[76] Inventor: Kelli A. Griffin, 6708 S. Turkey Creek Rd., Morrison, Colo. 80465

[21] Appl. No.: 398,756

[22] Filed: Mar. 6, 1995

[51] Int. Cl.⁶ .................................................. A01K 13/00
[52] U.S. Cl. ........................................ 119/706; 119/621
[58] Field of Search ............................. 119/83, 86, 706, 119/157; 297/219.1; 312/9.47, 9.48; 248/346.01, 346.5; 294/62

[56] References Cited

U.S. PATENT DOCUMENTS

| | | | |
|---|---|---|---|
| D. 221,400 | 8/1971 | O'Donnell | 248/346.5 X |
| D. 322,494 | 12/1991 | Reynolds | 119/706 X |
| 4,926,796 | 5/1990 | Leopold | 119/83 |
| 4,996,946 | 3/1991 | Olson | 119/706 |

*Primary Examiner*—Robert P. Swiatek
*Attorney, Agent, or Firm*—Thomas W. Hanson

[57] ABSTRACT

A scratching post suitable for use by cats and other clawed animals which can be held in position adjacent to an item of furniture without physical attachment to the surface of the furniture. The apparatus is comprised of a horizontal base plate and one or more vertical members. The vertical members are arranged so as to conform to the shape of a portion of the piece of furniture which they are protecting and are attached at their bottom ends to the base plate. This base plate is then inserted under the piece of furniture. The weight of the furniture holds the base plate in place which, in turn, holds the vertical members in place around the piece of furniture. The vertical members are either constructed of a suitable scratching material or are covered in such a material.

5 Claims, 1 Drawing Sheet

CAT SCRATCHING POST FOR USE WITH FURNITURE

FIELD OF THE INVENTION

This invention relates to scratching posts for cats and more particularly to scratching posts which can be attached to furniture.

BACKGROUND INFORMATION

It is well known that cats sharpen their claws by "scratching" them on various objects. Where a suitable object is not provided, cats will use whatever is available. This often results in damage to furniture, carpeting, draperies or other household articles which are selected by cats for this exercise.

Cat owners have long known to provide a scratching post for the cat to use. When properly constructed, it will be more attractive to the cat than the available household items. When this is true, the cats will usually choose to use the supplied scratching post, sparing the furniture. Scratching posts have been constructed of a variety of materials including cardboard, as disclosed by Kahanick in U.S. Pat. No. 3,486,485, cork, Frank, U.S. Pat. No. 4,611,556, and, more commonly, carpeting, Bradford, U.S. Pat. No. 5,054,429. Some posts have been designed to attach to doors, see Frank, supra, and Barnes, U.S. Pat. No. 5,275,128 while the majority are designed to rest on the floor, see Bradford, supra.

In addition, some cat owners use protective devices which prevent cats from scratching furniture. These devices are typically constructed from a material, such as hard plastic, which the cats are unable to scratch, and are attached to or cover the surface of the furniture in areas where the cats are prone to scratch. One such device is disclosed in U.S. Pat. No. 336,033 to Welsh. While deterring the activity at that location, these devices do nothing to protect the remainder of the furniture or to fulfill the need to scratch.

It is desirable to provide a single device which serves both of the roles of scratching post and furniture protector. When placed over a portion of a piece of furniture in a location already selected by the cat for scratching, it will protect the furniture by shielding it, and will supply a surface suitable for scratching, fulfilling the cat's basic need and attracting it away from other portions of the furniture.

SUMMARY OF THE INVENTION

The invention is a scratching post intended to be positioned at the corner or on the side of a piece of furniture. One or more vertical pieces are attached to a horizontal plate at their lower ends. Optionally, the vertical members may be joined together at their adjacent vertical edges in order to strengthen the structure. The resultant fixture can be envisioned as a vertical column with one or more sides and the bottom enclosed.

This configuration allows the fixture to be placed in close proximity to a piece of furniture with the bottom plate placed under the leg or foot of the furniture. In this way, the weight of the furniture will hold the scratching post in place with the vertical pieces adjacent to and covering a portion of a side or corner of the piece of furniture.

The exposed vertical surfaces are covered with a material, such as carpet, which is attractive to cats for scratching. The invention thus provides a scratching post at a location naturally attractive to cats, which will blend into the surroundings and also serve to protect the furniture. The furniture protector disclosed by Welsh uses a structure which is similar to one embodiment of the invention but does not provide the utility of a scratching post. This added ability increases the effectiveness of the invention in deterring scratching of the furniture. In addition to protecting a specific portion of the furniture, the invention also provides a suitable scratching surface, satisfying the instinct to scratch rather than just redirecting the need elsewhere.

While it is apparent that this invention is also applicable to use with clawed animals other than cats, it is anticipated that the most prevalent use of the invention will be for cats. Thus, for simplicity, the description herein is solely in terms of cats.

DESCRIPTION OF THE PREFERRED EMBODIMENT

Figure 1:
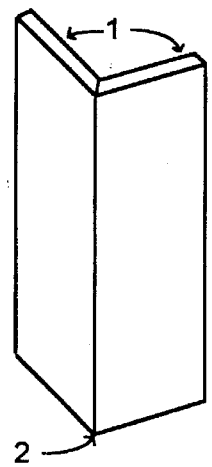
FIG. 1 shows the invention from the front. This is as it would appear while in use.
Figure 2:
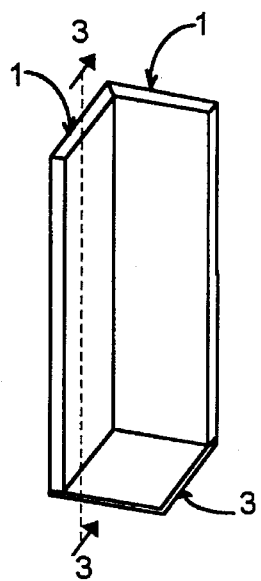
FIG. 2 shows the invention from the rear revealing the base member 3.
Figure 3:
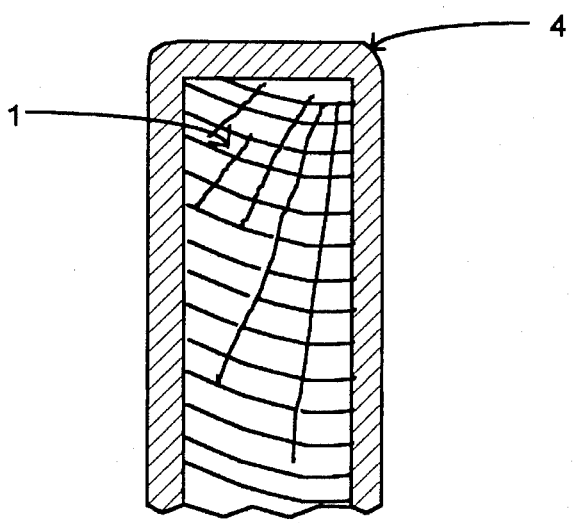
FIG. 3 is a cross section of a vertical member, 1, taken longitudinally through the member, showing the covering material, 4.

The preferred embodiment is designed to be placed at the corner of a piece of furniture. Two vertical members, 1, are attached to each other along their common vertical edge, forming a vertical seam, 2. The angle of this joint may be altered to adapt the invention to furniture of varying configuration but is most commonly approximately 90 degrees.

The vertical members are constructed from a rigid, or near rigid, material. While some flexing is acceptable, the members must be sufficiently rigid to resist the pulling force exerted by a cat without significant distortion of the member. Wood has been found to be an ideal material as it offers the requisite rigidity, is easily formed, and provides a base structure to which the covering material is easily attached.

The exposed faces of the vertical members are covered with a material, 4, suitable for clawing or scratching by cats. The material should be durable while providing a suitable grip and texture. Carpeting has been found to perform well. For aesthetic purposes and for ease of construction, the covering material is extended over the exposed edges and the reverse side of the vertical members.

The base member, 3, is attached to the lower ends of the vertical members. The primary role of the base member is to anchor the invention in place. It also significantly strengthens the structure by resisting axial motion of the vertical members about the vertical seam, 2. In use, the base member is inserted under the foot, or leg, of a piece of furniture. The weight of the furniture holds the base member in place on the floor, fixing the entire structure in place adjoining the corner of the furniture item.

The base member must be constructed of a material which satisfies two conflicting requirements. It must be strong enough that, when held down by the furniture, it can hold the vertical members in place as one or more cats scratch at the vertical members. The base member must also be sufficiently thin that when inserted under one leg of a piece of furniture, the furniture will not be distorted to the point that it sits unevenly on the floor, is structurally damaged, or is aesthetically unpleasant. In practice, it has been found that sheet plastic, of sufficient rigidity, performs well for the base member. Other materials which can be used include wood and metal. Wood of sufficient strength may be too thick while metal increases the expense of the invention and may pose a risk of scratching the underlying floor. Plastic avoids the risk of scratching while providing sufficient strength in a thickness meeting the above requirements.

The three members can be attached together using any of a variety of means common in the industry. Adhesives, screws, nails, and brackets, among other methods, perform well, either individually or in combination. The covering material may also be attached to the vertical members using a variety of common methods. Adhesives, carpet tacks, and staples are all satisfactory.

While the preferred form of the invention has been disclosed above, alternative configurations for the invention are readily apparent. A greater number of vertical members can be used, connected at appropriately larger angles, to enclose large radius or multi-faceted corners. A single vertical member could be used to protect a single surface, such as the front edge of the arm of a chair or the end of a couch. The above description of the preferred embodiment is intended to be illustrative only and not to limit the scope of the invention.

I claim:

1. A cat scratching post for use with a furniture item comprising:
    (a) a horizontal base member wherein said horizontal base is adapted to be placed under the furniture item;
    (b) first and second vertical members attached to and extending upward from said base member, at least one of said vertical members having a vertical dimension greater than ten (10) times the thickness of said base member, wherein a partially enclosed column adapted to abut a corner of the furniture item is formed, and an essentially vertical surface suitable for scratching by cats is provided.

2. The scratching post of claim 1 wherein said vertical members are constructed of a material suitable for scratching or clawing by a cat.

3. The scratching post of claim 1 where said vertical members have inwardly facing and outwardly facing surfaces, further comprising a surface layer, covering at least said outwardly facing surface of said vertical members, said surface layer suitable for scratching or clawing by a cat.

4. The furniture protecting apparatus of claim 3 wherein said surface layer comprises a layer of textile material.

5. A cat scratching post for use with a furniture item comprising:
    (a) a horizontal base member, wherein said horizontal base is adapted to be placed under the furniture item;
    (b) first and second vertical members attached to and extending upward from two adjacent edges of said base member, said vertical members joined at their adjacent vertical edges, having a vertical dimension greater than the smallest horizontal dimension of said base member, and having inwardly facing and outwardly facing surfaces; and
    (c) a surface layer, covering at least said outwardly facing surface of said vertical members, said surface layer comprising a layer of textile material suitable for scratching or clawing by a cat;
    wherein a two-sided column is formed for partially enclosing a corner of the furniture item, and an essentially vertical surface is provided suitable for scratching by cats.

\* \* \* \* \*